July 10, 1962  F. SCHYTIL  3,043,652
FLUID BED PROCESS FOR GRANULATING FINE-GRAINED MATERIALS
Filed Oct. 10, 1957  2 Sheets-Sheet 2

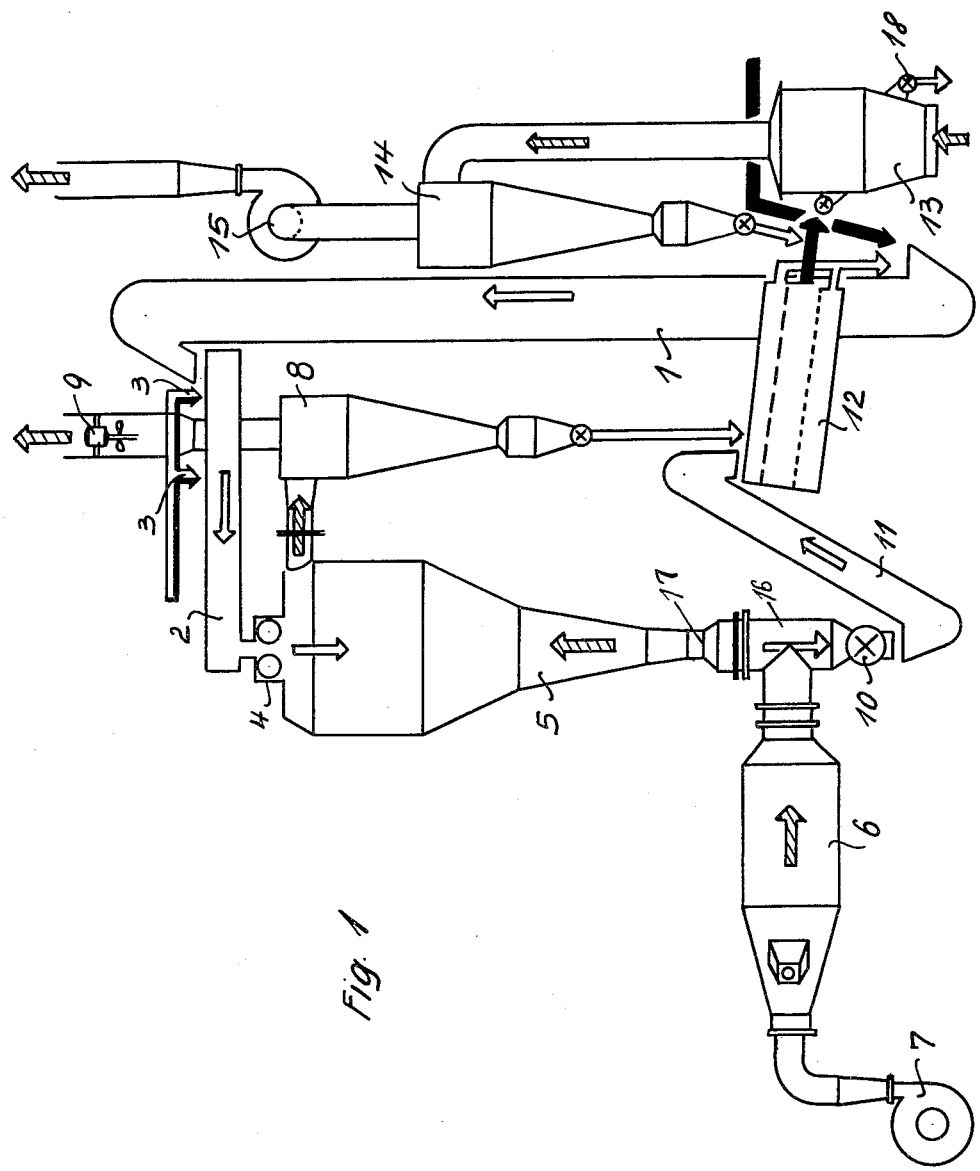

Inventor
FRANZ SCHYTIL
Bailey, Stephens & Huettig
Attorneys

3,043,652
FLUID BED PROCESS FOR GRANULATING FINE-GRAINED MATERIALS

Franz Schytil, Frankfurt am Main, Germany, assignor to Metallgesellschaft Aktiengesellschaft, Frankfurt am Main, Germany
Filed Oct. 10, 1957, Ser. No. 689,403
Claims priority, application Germany May 18, 1951
8 Claims. (Cl. 23—1)

This invention relates to a process and apparatus for granulating fine particles into larger sized particles, and further to produce a chemical reaction simultaneous with the forming of large particles, if desired. As used herein, the terms "granulating" and "agglomerating" are used to mean the gathering together of fine particles in order to form larger sized coarser particles. The known processes for producing coarse agglomerates of fine particles consists either in the sintering of the particles on a sintering band or in the granulating or pelletizing of the particles by means of a rolling movement as accomplished, for example, in granulating drums, granulating discs, or in rotary kilns. In these known processes, the output of granular material is proportionately small with respect to the space requirement and investment costs of the apparatus.

It is also known to burn and simultaneously agglomerate to pea size calcium carbonate granules with the addition of soda in a fluid bed. A furnace having a perforated conical lower portion is used for this process. The gas for forming the fluid bed is introduced at different heights through this lower portion so that the speed of the gas is maintained constant throughout the height of the lower portion.

According to the fluid bed process, the output is high, but the process is very sensitive and easily influenced by disturbances because, as is known, fluid beds are subject to becoming baked into a mass as soon as agglomerating conditions appear. Obviously, this stops the fluid bed operation.

This invention discloses a process which permits the agglomeration of fine-grained materials in a fluid bed having the high output characteristic of fluid beds, and without the danger of the particles baking together if a certain small range of operating conditions is exceeded.

The process of this invention is performed by forming a fluid bed in a reaction chamber having an open bottom without any grate therein, and with a single fluid bed gas supply nozzle mounted on the lowest part of the reaction chamber. The velocity of the gas in the chamber decreases from the bottom toward the top in such a manner that the stream of gas does not separate from the wall of the chamber at least over the greatest part of the height of the chamber, as, for example, about one-third to one-half and preferably about one-half of the height of the chamber. For this reason, the reaction chamber is enlarged in an upward direction with the proper angle of opening being of deciding effect. If this aperture angle is made too small, a grinding effect occurs in the material within the fluid bed, which is just the contrary of the result being sought. Furthermore the range of existence of the fluid bed will be very small with relation to the gas velocity. This means that with a minimum gas velocity the fluid bed will settle and fall out of the chamber, while, when just a little more than the highest allowable gas velocity is used, the material in the fluid bed will be blown out of the chamber.

Further, if the aperture angle is made too large, the gas stream breaks away from and is separated from the wall of the chamber, and a fountain is formed by the material in the fluid bed in the middle of the chamber, while quiet unfluidized zones of material occur on the outer edge of the bed.

To obtain the effect of this invention, the aperture angle at the point where the gas is introduced into the chamber must be kept within narrow proportional limits in such a manner that a diffusing effect occurs, that is that the gas stream does not separate from the chamber wall. It is commonly known that in ordinary gas flow this requirement can be met if the aperture angle is kept within 4 to 8°. A tube having such an angle is known as a Venturi tube and is ordinarily used as a measuring device and also for the recovery of gas impulses, as in a gas transporting device.

An essential feature of this invention lies in that parts of the known Venturi tube techniques are used in fluid bed reactors.

According to this invention, the use of the techniques is not in the same manner as a Venturi tube used with gas alone.

In this invention, the aperture angle of the reactor chamber is made larger than is necessary and permissible for the obtaining of the Venturi effect with simple gas flow. The aperture angle at the lower end of the chamber is held within the limits of 10 to 30°. The keeping of these limits is especially important in order to obtain the desired result. If the lower allowable limit is passed, a grinding effect occurs in the material being treated and the range of existence of the fluid bed becomes smaller with reference to the gas velocity, and the output becomes small with regard to the space required for the apparatus. If the upper allowable limit is exceeded, no uniform fluidization can be maintained; and consequently, the material in the whole of the bed becomes baked together. Thus, the aperture angle should be kept in the center of the allowable range as from 12 and 21°, and preferably between 14 and 18°.

Another feature of the invention is in that it is possible to increase this aperture angle in an upward direction in the reaction chamber above the lowest starting portion, but this increase must not be so large as to cause the gas stream to separate from the reaction chamber wall. To provide for the Venturi effect in order to perform the process of this invention, it is evident that not only the basic structure but the whole of the reactor be designed in accordance with the above requirements, that is to say that the aperture angles are kept within the above mentioned limits. Also, no space requiring structures, as, for example, return cyclones, are incorporated. Such structures would cancel the increase in the diameter of the chamber in an upward direction. Structures requiring little or no space, such as thin guiding plates or cooling tubes, which take up little space with respect to the volume of the reactor are usable and, under some circumstances, even advantageous because these structures can be used to direct the gas stream so as to prevent it from separating from the chamber wall. In any event, these structures should not be located in the portion of the chamber where the intake gases are introduced because their presence would prevent the most essential advantage of the process which lies in the forming of a completely uniformly fluidized free floating dense fluid bed which neither rests upon a grate or upon oblique side walls.

In order to obtain the results of the invention, it is also necessary to maintain a dense fluid bed in the reactor. Such dense bed has a particle density of from about 200 to 1000 kg./m.³, the value being dependent upon the specific weight of the solid particles being treated. Solid suspensions, as are used in the prior art flash roasters and pneumatic lift processes, having a particle density of from about 20 to 100 kg./m.³, thus have nothing in common with the free floating dense fluid bed and are therefore unsuitable for granulating materials and likewise unsuitable for carrying out chemical or physical reactions at certain times as accomplished by this invention.

The maintaining of granulating or agglomerating conditions in the reaction chamber is a further requirement for the invention, this being either with the simultaneous supplying of a bonding substance during the process or before charging the fine-grained material into the reaction chamber, and/or the maintaining of a temperature in the chamber at which the solids become sticky or liquid.

According to another feature of the invention, the gas used to form the fluid bed is introduced into the reaction chamber in such a manner that the opening into the reaction chamber does not have a uniform gas pressure thereacross. This can be accomplished in a simple way. A wind chamber is formed as an extension downwardly from the reaction chamber and into which the gas is supplied sideways, that is to say horizontally, and at a right angle to the direction of the flow of the gas upward into the reaction chamber. By means of this construction, the gas stream is deflected by the wall of the wind chamber which is opposite the gas entry port, and the thus deflected gas stream passes upwardly through the reaction chamber opening with a varying pressure over the area of the opening. Thus, in addition to the unregulated air swirl in the reaction chamber, a strong vertical swirl is formed by the incoming gas, which strong swirl extends through the major portion of the reaction chamber.

Further, according to the invention, other chemical or physical reactions can be carried out in the fluid bed in addition to the agglomeration of the particles in the bed. Such other reactions are, for example, the drying of moist material, the roasting of fine grain sulphidic ores, as pyrite or zinc blend, the roasting of antimony containing ores with the simultaneous removal of the antimony above the melting point with the advantage that the removal of the antimony at temperatures above the melting point is much faster and more complete than during the removal below the melting point which was the only process known until now, the burning of cement, lime, dolomite, bauxite, silicates, phosphates, and sulphates with simultaneously agglomeration, with or without the use of a binder, such as soda, the removal of elementary sulphur from pyrite, and the evaporation of a solution while simultaneously producing granules from the residue, as in the blowing of zinc containing slag.

In operating the process of this invention, a completely free flowing dense fluid bed is maintained which neither rests upon a grate at the bottom of the reaction chamber nor upon the oblique side walls of the chamber, but is supported only from the bottom by the gas pillow formed by the incoming gas. The gas velocity can be adjusted exactly to the size and specific weight of the particles forming the fluid bed so that all of the particles remain in the fluid bed. It is also possible to adjust the gas velocity so that only such particles that have a weight and size below a certain limit remain in the fluid bed, while the larger and heavier particles drop down and are discharged through the open bottom of the reaction chamber. This latter mode of operation has the advantage in that the fluid bed can be operated with a very high volume efficiency in the granulating or agglomerating of materials. All particles which have not been united into the desired size remain in the fluid bed for future treatment, while the particles which have reached the desired size are immediately and automatically removed from the bed and thus do not unnecessarily occupy reaction chamber space. Another advantage of considerable importance is in that the final particle size being formed from very small granules can be kept within very close limits. In prior processes, the desired size of the granulated particles can be obtained by use of a granulating disc, but this is only possible in producing granules having a proportionally large diameter, as above 3 to 5 mm. In the invented process, the diameter of much smaller granules can be kept within very narrow limits.

Compared to the production of large particles, the process of the instant invention can produce much smaller granules, as, for example, granules having a diameter of 0.65 mm. with a tolerance of ±0.15 mm. during the first throughput of the material through the apparatus and with a yield of about 80 percent of the granules of desired size. Therefore, from the total output, only about 20 percent of over- and under-sized particles must be sieved out and reprocessed.

Consequently, this process is very useful for the production of small granules within a narrow range of tolerance, but, however, much larger granules with a diameter of 15 to 25 mm. and completely spherical can also be produced.

In addition to the granulating advantages of the fluid bed of this process, the temperature of the fluid bed can be kept substantially constant within a very narrow range by simultaneously controlling the heat, that is to heat values which are quite lower than the temperature of the gas used for forming the fluid bed. For example, washing powder mixtures can be dried and granulated simultaneously by means of hot gases at a temperature of about 350° C., and with the temperature within the fluid bed nowhere exceeding at any place and time a temperature of 60° C. The temperature within the fluid bed can be kept substantially constant within 55 to 58° C. without difficulty in spite of the much higher temperature of the gas supplied to form the fluid bed. This low temperature with the fluid bed permits the treatment of very sensitive particles, as, for example, perborate or enzyme substances, which do not decompose in any essential degree such as would occur at slightly higher temperatures, while at the same time the operation can be performed with proportionally hot gases for the improvement of the heat economy and the output.

If the process is directed primarily to the granulation of particles, it is possible according to another feature of the invention to pre-mix the dry fine-grained material with a sufficient quantity of fluid and thus obtain a crumbly paste. This paste is then passed through a roller press in which it is deformed under a low pressure of about 2 atmospheres into at least partially small loose flakes and break apart to large size agglomerations previously produced by moistening. In this particular process, only a very little binding matter is needed, and consequently, heat is saved that is needed for the following evaporation before granulating in the fluid bed. The crumbling state is preferably carried out by means of a helical blade mixer.

The means by which the objects of the invention are obtained are illustrated in the accompanying schematic drawings, in which:

FIGURE 1 is a side elevational view of an apparatus for performing the process;

Figure 3:
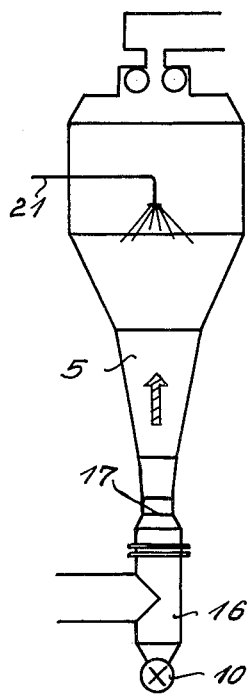
FIGURE 3 is a cross-sectional view through a modified form of a reaction chamber.

As shown in FIGURE 1, the material to be treated is transferred by vertical elevator 1 and dropped into a mixer 2. Water from nozzles 3 is sprayed on the material so that a crumbly mixture is prepared which is pressed through rollers 4 to break apart the larger lumps of mixed material. The material then drops into reactor chamber 5. Air heater 6 receives air from blower 7 with the heated air passing into wind chamber 16. The air enters the wind chamber substantially perpendicular to the vertical axis of the chamber and is deflected so that the air rises with a vertical swirling motion through the open bottom 17 of the reaction chamber, this opening being in the form of a Venturi nozzle. Upwardly from nozzle 17, the aperture angle is successively increased so that chamber 5 has upwardly divergent walls forming different zones. The gas emerging from the upper end of the reaction chamber passes to dust separator 8 from which the clean gas is exhausted to the atmosphere through fan 9.

Heavy granulated particles formed in reaction chamber 5 drop through valve 10 into conveyor 11 which transfers them to sieve 12. From the sieve, the fines are recirculated through conveyor 1 while the heavier particles are passed into the cooler 13 and then through valve 18 onto a conveyor belt. From the cooler, the dust laden air is taken to dust separator 14 from which the dust is dropped back into the conveyor 1 for recirculation and the clean air exhausted through blower 15 into the atmosphere.

Figure 2:
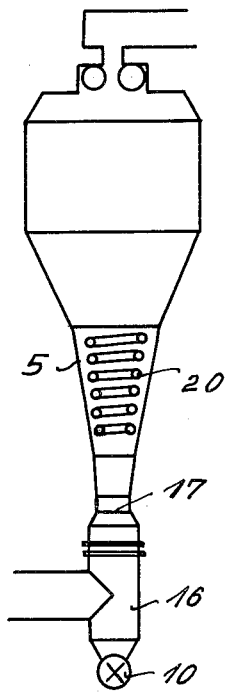
FIGURE 2 is a cross-sectional view through one form of a reaction chamber.

In FIGURE 2, cooling tubes 20 are inserted in the reaction chamber for the purpose of extracting heat from the fluid bed.

In FIGURE 3, a spray nozzle pipe 21 is inserted into the upper portion of the reaction chamber for spraying liquid into the fluid bed.

The operation of the apparatus is as set forth in the following specific examples.

*Example 1 (Granulating a Fertilizer Mixture Composed of Thomas Slag and KCl)*

A mixture is prepared composed of 70 parts Thomas slag having a content of 18 percent citric acid soluble $P_2O_5$ and 30 parts crude potassium chloride with a potassium content corresponding to 60 percent $K_2O$. This Thomas slag has a sieve analysis of 90 percent of the particles less than 0.2 mm. and the crude potassium chloride particles 90 percent less than 0.3 mm. This mixture is granulated in the apparatus shown in FIGURE 1.

From conveyor 1, 18 tons/h. of the mixture were fed to mixer 2. In the mixer, water is added from nozzles 3 so that a crumbling mixture having a moisture content of 13 percent $H_2O$ is formed. The crumbling mixture is passed through rollers 4. The rollers rotate at different speeds and are separated by a space therebetween of 4 mm. Therefore, the crumbling material passing through rollers 4 has the larger particles broken apart, the particles having a maximum size of 4 mm. or smaller, so that a mixture of non-crumbling fine-grained material, small loose crumbs, and loose crumbs of a size up to 4 mm. were discharged. This mixture of fine particles having diameters of from 0 to 4 mm. were dropped into the top of reaction chamber 5. Blower 7 delivers 7,000 Nm.$^3$/h. (normal cubic metres per hour, i.e. the volume calculated as for 0° C. and 760 mm. Hg) through wind chamber 16 into reaction chamber 5. The air is first heated to 800° C. in heater 6. Immediately above the Venturi opening 17, a fluid bed is formed with the material dropped through rollers 4, the bed having a uniform granulating temperature of 120° C., which temperature is substantially constant throughout the whole fluid bed. Venturi opening 17 in the bottom of the reaction chamber has a diameter of 380 mm. so that the effective gas velocity through the opening is 66 m./sec. The walls of the reaction chamber are formed so that the lower section has an aperture angle of 16° adjacent opening 17, the walls at this angle extending to a vertical height of 1.6 times the nozzle diameter. Above this wall section, the aperture angle is increased to 20° with a wall height equal to 5 nozzle diameters. A third section above this latter section has an aperture angle of 50°. The height of this third section is 7 times the nozzle diameter. In the fluid bed formed by the material having a grain size of 0 to 4 mm., granules are formed as rounded solids having a diameter of from 2 to 3 mm., which granules drop through nozzle opening 17.

The granules so formed are discharged through valve 10 and taken by conveyor 11 into sieve 12. This sieve separates the granules having the desired size of from 2 to 3 mm. in the amount of 7 tons/h. Over- and undersized granules drop into conveyor 1 for recirculation. The output of the desired granules is cooled in a fluid bed cooler 13 down to a temperature of 30° C. and then passed through valve 18 onto a conveyor belt, not shown.

The exhaust gas from reaction chamber 5 and from cooler 13, together with about 2 percent of the output, is separated in cyclones 8 and 14, respectively, with the dust and particles being recirculated. The clean gas is exhausted to the atmosphere through blowers 9 and 15, respectively.

*Example 2 (Roasting of Pyrite)*

In the mixer 2, a mixture is crumbled at the rate of 5 tons/h., the mixture being composed of flotation pyrite with the particles having a size less than 0.1 mm., a sulphur content of 46 percent, and a moisture content of 8 percent, the mixer being that shown in FIGURE 1. No water was added to the mixture as the natural water content of the pyrite is sufficient. After crumbling in the mixture, the material was passed through rollers 4 having a clearance of 2 mm. between the rollers in order to put the material into the form of loose-leaf shaped flakes. These flakes, together with the fine material which passed through the rollers unchanged or only slightly changed, are dropped into the reactor 5. This reactor is the same as shown in FIGURE 1. The gas for forming the fluid bed is not pre-heated and is introduced into the bed at the rate of 12,000 Nm.$^3$/h. The gas is passed through nozzle opening 17 at the rate of 28 m./sec., this being the reduced gas speed under normal conditions.

A uniform temperature of 920° C. is created in the fluid bed. Solidified rounded granules of $Fe_2O_3$ having a diameter of 2 mm. were formed in the bed and dropped out through nozzle opening 17. These granules were roasted until they had a residual sulphur content of about 0.4 percent. Heat exchange cooling elements were built in the reactor chamber within the fluid bed. These are located in the chamber zone having an aperture angle of 20°, because in this zone, the bed has its highest density and therefore the best heat transfer conditions. The cooling element is composed of a tube structure 20 in the form of an obtuse cone having an aperture angle of 18° which is a little smaller than the aperture angle of the encompassing reactor chamber zone. These tubes are shown in FIGURE 2.

The reacted material was composed of 95 percent granules having a grain size of from 1.5 to 2.5 mm. and 5 percent dust.

By means of the heat exchange coils 20, 65,000 kcal. in the form of steam at a temperature of 350° C., was recovered per ton of pyrite.

*Example 3 (Roasting of Zinc Blend Without Pre-Treatment)*

Flotation zinc blend consisting of particles having a size less than 0.1 mm. were charged into the reaction chamber at the rate of 6 tons/h. without being pre-treated in the mixer or rollers. The reactor is as shown in FIGURE 1. The gas for forming the fluid bed was not pre-heated and is introduced into the reaction chamber at the rate of 12,000 Nm.$^3$/h., the gas passing through wind chamber 16 and nozzle opening 17. No heat exchange cooling elements were used. The roasting temperature in the chamber is 1260° C. Granules having a diameter of 5 mm. were dropped out from the fluid bed through nozzle opening 17. These granules are composed mainly of ZnO with a residual sulphur content of 0.6 percent.

*Example 4 (Granulating LiCl From a Solution)*

The apparatus shown in FIGURE 1 was charged with 7,000 Nm.$^3$/h. of fluidization gas having a temperature of 800° C. In the upper section of chamber 5, a spray nozzle 21 was placed, as shown in FIGURE 3. Through this nozzle 2 m.³/h. of 50 percent LiCl solution was sprayed into the chamber. In the fluid bed, solid granules of dried LiCl composed of particles having a diameter of 3 mm. were formed which dropped out through nozzle opening 17. The fluid bed had a temperature of 140° C.

*Example 5 (Incandescent Phosphate Production With Partial Pre-treatment)*

One ton/h. of a mixture composed of 90 percent apatite, 4 percent soda, and 6 percent quartz sand was moistened in the mixer 2. The rollers 4 were omitted. The dry mixture had a total phosphoric acid content of 32 percent $P_2O_5$ and a citric acid soluble phosphoric acid content of 4 percent $P_2O_5$. The mixture was moistened and introduced into the reactor of a grain size of from 2 to 4 mm. Fluidization gas was introduced through nozzle opening 17 at the rate of 5,000 Nm.³/h. at a temperature of 2000° C. A uniform temperature of 1400° C. was created within the fluid bed and the introduced material was thereby separated and granulated. The finished granules having a particle size of from 2 to 5 mm. dropped out through nozzle opening 17. These granules had a content of 29 percent citric acid soluble $P_2O_5$.

This application is a continuation-in-part of my applications Serial No. 287,359, filed May 12, 1952, and Serial No. 454,452, filed August 27, 1954, both now abandoned.

Having now described the means by which the objects of the invention are obtained, I claim:

1. A process for granulating fine grain materials comprising introducing fluidization gas through the open bottom of a reaction chamber having outwardly diverging walls, the gas velocity decreasing in an upwardly direction in said chamber without the gas being separated from said walls over the major portion of the chamber, dropping fine-grained materials into said gas in said chamber to form a dense fluid bed for agglomerating conditions, said materials with said bed resting solely upon the pillow of gas formed by the gas entering said chamber, and removing heavy agglomerated particles by gravity flow through the open bottom of said chamber.

2. A process as in claim 1, further comprising simultaneously both physically and chemically reacting said materials.

3. A process as in claim 1, further comprising dropping moist material into said chamber, and drying said material while agglomerating the same in said fluid bed.

4. A process as in claim 1, further comprising roasting said material while agglomerating the same in said bed.

5. A process as in claim, 1 further comprising moistening and then crumbling said material to the desired particle size before dropping the material into said chamber.

6. A process as in claim 1, comprising introducing the gas through said bottom with the gas pressure unevenly distributed thereover, and with the gas rising in said chamber with a swirling movement extending over the greater portion of said chamber in addition to the turbulent movement of the fluid bed.

7. A process as in claim 1, further comprising feeding a material binder into said chamber for agglomerating said material.

8. A process as in claim 1, further comprising heating said bed to a temperature at which the materials in said bed become sticky and agglomerate.

References Cited in the file of this patent

UNITED STATES PATENTS

| | | |
|---|---|---|
| 1,730,738 | Levermore | Oct. 8, 1929 |
| 1,941,592 | Bacon et al. | Jan. 2, 1934 |
| 2,020,431 | Osborne et al. | Nov. 12, 1935 |
| 2,429,721 | Jahnig | Oct. 28, 1947 |
| 2,431,455 | Blanding | Nov. 25, 1947 |
| 2,536,402 | Voorhees | Jan. 2, 1951 |
| 2,677,608 | McKay et al. | May 4, 1954 |
| 2,870,002 | Johnson | Jan. 20, 1959 |

FOREIGN PATENTS

| | | |
|---|---|---|
| 527,302 | Great Britain | Oct. 7, 1940 |
| 617,427 | Great Britain | Feb. 7, 1949 |